United States Patent
McGinnis et al.

(10) Patent No.: US 9,822,021 B2
(45) Date of Patent: *Nov. 21, 2017

(54) FORWARD OSMOSIS SEPARATION PROCESSES

(71) Applicant: Yale University, New Haven, CT (US)

(72) Inventors: Robert L. McGinnis, Cambridge, MA (US); Menachem Elimelech, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,284

(22) Filed: May 23, 2016

(65) Prior Publication Data

US 2016/0340212 A1    Nov. 24, 2016

Related U.S. Application Data

(60) Continuation of application No. 13/420,052, filed on Mar. 14, 2012, now Pat. No. 9,352,281, which is a
(Continued)

(51) Int. Cl.
*B01D 11/00* (2006.01)
*B01D 61/00* (2006.01)
(Continued)

(52) U.S. Cl.
CPC ............ *C02F 1/445* (2013.01); *B01D 61/002* (2013.01); *B01D 61/005* (2013.01); *B01D 61/36* (2013.01);
(Continued)

(58) Field of Classification Search
CPC ........ C02F 1/445; C02F 2103/08; C02F 9/00; C02F 2301/046; C02F 2303/18
See application file for complete search history.

(56) References Cited

U.S. PATENT DOCUMENTS 3,130,156 A    4/1964 Neff
3,171,799 A    3/1965 Batchhelder
(Continued)

FOREIGN PATENT DOCUMENTS

EP    0121099 A2    10/1984
FR    2102763 A5    4/1972
(Continued)

OTHER PUBLICATIONS

International Search Report and Written Opinion of the Intenational Searching Authority from PCT/US2009/048137 dated Feb. 1, 2010.
(Continued)

*Primary Examiner* — Ana Fortuna
(74) *Attorney, Agent, or Firm* — McCarter & English, LLP; Wei Song

(57) ABSTRACT

Separation processes using forward osmosis are disclosed generally involving the extraction of a solvent from a first solution to concentrate a solute therein by using a second concentrated solution to draw the solvent from the first solution across a semi-permeable membrane. One or both of the solute and solvent may be a desired product. By manipulating the equilibrium of the soluble and insoluble species of solute within the second solution, a saturated second solution can be used to generate osmotic pressure on the first solution. The various species of solute within the second solution can be recovered and recycled through the process to affect the changes in equilibrium and eliminate waste products. Enhanced efficiency may result from using low grade waste heat from industrial or commercial sources.

14 Claims, 3 Drawing Sheets

Related U.S. Application Data continuation-in-part of application No. 13/000,198, filed as application No. PCT/US2009/048137 on Jun. 22, 2009, now abandoned, said application No. 13/420,052 is a continuation-in-part of application No. 13/086,050, filed on Apr. 13, 2011, now Pat. No. 8,753,514, which is a continuation of application No. 12/431,314, filed on Apr. 28, 2009, now Pat. No. 8,002,989, which is a division of application No. 10/486,957, filed as application No. PCT/US02/02740 on Feb. 1, 2002, now Pat. No. 7,560,029.

(60) Provisional application No. 61/074,199, filed on Jun. 20, 2008, provisional application No. 61/074,195, filed on Jun. 20, 2008, provisional application No. 60/265,745, filed on Feb. 1, 2001.

(51) Int. Cl.
*B01D 61/24* (2006.01)
*C02F 1/44* (2006.01)
*C02F 9/00* (2006.01)
*C02F 1/02* (2006.01)
*B01D 61/36* (2006.01)
*C02F 103/08* (2006.01)

(52) U.S. Cl.
CPC ............ *C02F 1/02* (2013.01); *C02F 2103/08* (2013.01); *Y02W 10/37* (2015.05)

(56) References Cited

U.S. PATENT DOCUMENTS

| | | |
|---|---|---|
| 3,216,930 A | 11/1965 | Giew |
| 3,405,058 A | 10/1968 | Miller |
| 3,532,621 A | 10/1970 | Hough |
| 3,617,547 A | 11/1971 | Halff et al. |
| 3,670,897 A | 6/1972 | Frank |
| 3,679,055 A | 7/1972 | Clark et al. |
| 3,707,231 A | 12/1972 | Bradley |
| 3,721,621 A | 3/1973 | Hough |
| 3,756,408 A | 9/1973 | Spatz et al. |
| 3,906,250 A | 9/1975 | Loeb |
| 3,978,344 A | 8/1976 | Jellinek |
| 4,142,966 A | 3/1979 | Perry |
| 4,767,422 A | 8/1988 | Bikson et al. |
| 4,778,597 A | 10/1988 | Bruzzi et al. |
| 4,781,837 A | 11/1988 | Lefebvre |
| 5,098,575 A | 3/1992 | Yaeli |
| 5,281,430 A | 1/1994 | Herron et al. |
| 5,324,428 A | 6/1994 | Flaherty |
| 5,382,365 A | 1/1995 | Deblay |
| 6,368,849 B1 | 4/2002 | Norddahl |
| 6,391,205 B1 | 5/2002 | McGinnis |
| 6,638,849 B2 | 10/2003 | Ting et al. |
| 7,560,029 B2 | 7/2009 | McGinnis |
| 7,727,400 B2 | 6/2010 | Flynn |
| 7,914,680 B2 | 3/2011 | Cath et al. |
| 8,002,989 B2 | 8/2011 | McGinnis |
| 8,246,791 B2 | 8/2012 | McGinnis et al. |
| 8,449,774 B2 | 5/2013 | Sharif |
| 8,753,514 B2 | 6/2014 | McGinnis |
| 8,815,091 B2 | 8/2014 | McGinnis |
| 9,039,899 B2 | 5/2015 | McGinnis |
| 9,044,711 B2* | 6/2015 | McGinnis ............ B01D 3/145 |
| 9,352,281 B2 | 5/2016 | McGinnis |
| 2005/0145568 A1* | 7/2005 | McGinnis ............ B01D 61/002 210/639 |
| 2010/0024423 A1 | 2/2010 | McGinnis et al. |
| 2010/0108587 A1* | 5/2010 | McGinnis ............ B01D 61/002 210/180 |
| 2010/0155333 A1 | 6/2010 | Husain et al. |
| 2011/0017666 A1 | 1/2011 | Cath et al. |
| 2011/0203994 A1* | 8/2011 | McGinnis ............ B01D 61/002 210/650 |
| 2011/0233137 A1 | 9/2011 | Cath et al. |
| 2012/0091062 A1* | 4/2012 | McGinnis ............ B01D 61/002 210/652 |
| 2012/0228222 A1* | 9/2012 | McGinnis ............ B01D 61/002 210/637 |
| 2012/0267308 A1 | 10/2012 | Carmignani et al. |
| 2014/0217026 A1 | 8/2014 | Han et al. |
| 2014/0238917 A1* | 8/2014 | McGinnis ............ B01D 61/002 210/180 |
| 2015/0165380 A1* | 6/2015 | Jung .................... B01D 61/005 210/648 |
| 2015/0175447 A1* | 6/2015 | SenGupta ............. C02F 1/68 210/638 |

FOREIGN PATENT DOCUMENTS

| | | |
|---|---|---|
| JP | 53-032885 | 3/1978 |
| JP | 57-012802 | 1/1982 |
| WO | 99/39799 A1 | 8/1999 |
| WO | 01/05707 A1 | 1/2001 |
| WO | 02/060825 A2 | 8/2002 |
| WO | 2008/137082 A1 | 11/2008 |

OTHER PUBLICATIONS

International Search Report and Written Opinion of the International Searching Authority from PCT/US2002/002740 dated Oct. 23, 2002.

McCutcheon J.R. et al., "A novel ammonia-carbon dioxide forward (direct) osmosis desalination process", Desalination, 174:1-11 (2005).

McCutcheon J.R. et al., "Desalination by ammonia-carbon dioxide forward osmosis: Influence of draw and feed solution concentrations on process performance", Journal of Membrane Science, 278:114-123 (2006).

McGinnis R.L. et al, "A novel ammonia-carbon dioxide osmotic heat engine for power generation", J Membrane Sci, 305:13-19 (2007).

McGinnins R.L. et al, "Energy requirements of ammonia-carbon dioxide forward osmosis desalination", Desalination, 207:370-82 (2007).

Murray, W. Bruce, "Desalting sea water with ammonia, Part 2: Osmosis", Water & Sewage Works, p. 525-528, (1968).

Wen N. et al., "Ammonium Carbonate Ammonium Bicarbonate, and Ammonium Carbamate Equilibria: A Raman Study", J Phys. Chem., 99:359-68 (1995).

* cited by examiner

FORWARD OSMOSIS SEPARATION PROCESSES

CROSS-REFERENCE TO RELATED APPLICATIONS

This application is a continuation of U.S. patent application Ser. No. 13/420,052, filed Mar. 14, 2012; which is a continuation-in-part of U.S. patent application Ser. No. 13/086,050, filed Apr. 13, 2011; which is a continuation of U.S. Pat. No. 8,002,989, filed Apr. 28, 2009; which is a divisional of U.S. Pat. No. 7,560,029, filed Dec. 27, 2004; which is the U.S. National Stage of International Application No. PCT/US02/02740, filed Feb. 1, 2002; which claims the benefit of and priority to U.S. Provisional Patent Application Ser. No. 60/265,745, filed Feb. 1, 2001; the entire disclosures of which are hereby incorporated by reference herein in their entireties. U.S. patent application Ser. No. 13/420,052, filed Mar. 14, 2012 is also a continuation-in-part of U.S. patent application Ser. No. 13/000,198, filed May 13, 2011; which is the U.S. National Stage of International Application No. PCT/2009/048137, filed Jun. 22, 2009; which claims the benefit of and priority to U.S. Provisional Patent Application Ser. Nos. 61/074,195, filed Jun. 20, 2008; and 61/074,199, filed Jun. 20, 2008; the entire disclosures of which are also hereby incorporated by reference herein in their entireties.

FIELD OF THE INVENTION

The invention generally relates to osmotic separation. More particularly, one or more aspects of the invention involve the use of osmotic processes, such as forward osmosis, for seawater desalination, brackish water desalination, wastewater purification, contaminated water remediation, or any other separation of solutes or solvents from solutions for, for example, product recovery in high purity applications, such as in the food and pharmaceutical industries.

BACKGROUND

Due to the abundance of seawater available and the increasing demand for water suitable for drinking and industrial use, seawater desalination continues to be important. Moreover, large scale, economic, and environmentally sound seawater desalination is especially important, because increases in the population and the continued expansion of various industries have created a growing need for new and inexpensive sources of potable water. Many diverse methods of desalination have been developed including the technologies of distillation, reverse osmosis, freezing, electrodialysis, ion exchange, and forward osmosis. Some of these various methods are detailed in U.S. Pat. No. 3,171,799 to Batchelder; U.S. Pat. No. 3,216,930 to Halff; U.S. Pat. No. 3,670,897 to Frank; and U.S. Pat. No. 5,098,575 to Yaeli.

The primary difficulties presented by these approaches to seawater desalination are adverse environmental impacts and exorbitant water production cost. For example, distillation and reverse osmosis are the most widely employed desalination methods, but both methods produce a process waste stream or brine discharge. Since these processes can only extract a portion (15-50%) of the water from salt water, the remaining seawater, with its increased salinity, is returned to the seawater source. Over a period of time, this waste stream or brine discharge can cause the average salinity of the environment to increase. Moreover, if the desalination process utilizes distillation, the temperature of the waste stream will be higher than the surrounding environs and this may also adversely affect the environment. The long term impact of the waste stream and the brine discharge on the environment is uncertain. But this impact is a significant consideration when constructing seawater desalination plants and has become a primary obstacle to the use of these plants. In addition, these widely employed desalination methods are also expensive. It typically costs twice as much or more to produce fresh water from seawater desalination than when water is obtained by other means. The combination of environmental impact and cost has made sea water desalination prohibitive for all but the most water-scarce environments.

Forward or natural osmosis has also been used for desalination. In general, the forward osmosis desalination process involves a container having two chambers separated by a semi-permeable membrane. One chamber contains sea water. The other chamber contains a concentrated solution that generates a concentration gradient between the saltwater and the concentrated solution. This gradient draws water from the saltwater across the membrane, which selectively permits water to pass, but not salt, into the concentrated solution. Gradually, the water entering the concentrated solution dilutes the solution. The solutes are then removed from the dilute solution to generate potable water.

In particular, U.S. Pat. No. 3,130,156 to Neff and U.S. Pat. No. 3,532,621 to Hough are directed to forward osmosis desalination processes. The Neff patent discloses a forward osmosis process in which a 2 molar solution of ammonium bicarbonate is used to draw water from seawater across a semi-permeable membrane. According to Neff, the dilute solution is then heated to decompose the ammonium bicarbonate solute into its constituent gases. The gases are then released from the solution, leaving behind potable water. The gases released from the solution in the process disclosed in the Neff patent are then compressed or cooled to generate ammonium bicarbonate that is recycled into the concentrated solution in the first step of the process. The Neff patent recognizes that this results in the removal of only a small amount of water from larger quantities of saltwater (low yield). Also, considerable amounts of energy are still needed to vaporize the gas constituents of the solute. Like Neff, the Hough patent discloses a forward osmosis process in which a concentrated solution is used to draw the water from the seawater across a semi-permeable membrane. However, unlike Neff, the Hough patent precipitates the solute out of the solution and recycles the precipitate back into the concentrated solution. According to Hough, expendable or separately recyclable solutes may be needed as reagents for this precipitation and pH adjustment, and further solutes may be needed to balance the pH of the potable water after the precipitation step. These further pH adjustments may result in further precipitation that must be discharged as waste. Thus, these desalination processes fail to remove substantial portions of drinkable water from sea water (high yields) and still require too much energy and result in too high an environmental impact (due to insufficient yield and subsequent brine discharge) to implement them on a larger scale.

In additional applications, it may be desirable to concentrate different species of solute that are present in a solution. In some conventional techniques, heat may be applied to change the phase of a solvent to remove it from the solution, thereby providing the desired species of solute in a higher concentration. Other conventional approaches involve hydraulic pressure driven membrane processes used to push a solvent through a membrane that is permeable to the solvent, but impermeable to the solute of interest. In the context of wastewater treatment, membrane bioreactors have widely replaced traditional secondary wastewater treatment methods for the removal of organic matter from aqueous waste streams. A hydraulic pressure-driven membrane system is typically used to separate water from a biologically active solution in which organic matter is consumed by microorganisms as food, these microorganisms then being separately removed as sludge. The foregoing methods of concentrating solutes have similar drawbacks to those discussed above with respect to desalinization.

SUMMARY OF THE INVENTION

The invention generally relates to systems and methods for separating solvents and/or solutes from solutions.

The invention provides a method and apparatus for obtaining a high yield of solvent from desalination without the excessive energy demands and/or environmentally harmful waste discharge associated with the prior art methods of desalination. The invention achieves this by using a method of forward osmosis in which the concentration of a second solution is increased, through equilibrium shifts in the solutes contained within the second solution, to a point where the second solution can withdraw most of the solvent from a first solution. Through this manipulation of equilibrium, the present invention is able to separate a solvent from solutes in an energy efficient manner that results in high yields and permits the recycling of the solutes within the process to significantly reduce or eliminate waste products and their associated environmental impacts. The solvent and/or concentrated solutes from a process stream may be desired end products. Generally, the equilibrium of more soluble to less soluble solutes are adjusted to maximize the concentration gradient between the second solution and the first solution and, thereby, the amount of water (or other solvent) removed from the first solution. This manipulation of equilibrium can also be used to remove said solutes with the minimum energy expense, providing for a high quality product (e.g., water). The invention can also use energy provided by cheap readily available heat sources, such as waste steam from power plants or industrial facilities, or from thermal solar collectors.

Additionally, the invention provides a forward osmosis separation process for concentrating and/or recovering desired or target solutes from a solution. The process includes introducing a first solution comprising a solvent and at least one target species on a first side of a semi-permeable membrane and introducing a second solution comprising ammonia and carbon dioxide in a molar ratio of at least 1:1 on a second side of the semi-permeable membrane. The second solution creates an osmotic concentration gradient across the semi-permeable membrane that promotes the flow of at least a portion of the solvent of the first solution across the semi-permeable membrane, forming a third solution on the first side of the semi-permeable membrane and a fourth solution on the second side of the semi-permeable membrane. The process can also include promoting the flow of at least a portion of the fourth solution to a separation process to thereby generate draw solutes and a solvent stream. The process may further include returning the draw solutes to the second side of the semi-permeable membrane. The process can also include recovering the at least one target species from the third solution for further processing or use.

In one aspect, the invention relates to a method of concentrating at least one solute using a forward osmosis separation process. The method includes the steps of introducing a first solution comprising the at least one solute to a first side of a semi-permeable membrane; introducing a concentrated draw solution comprising ammonia and carbon dioxide in a molar ratio of at least 1:1 to a second side of the semi-permeable membrane; concentrating the at least one solute within the first solution by promoting the flow of a solvent from the first solution, across the membrane and into the concentrated draw solution via an osmotic concentration gradient across the semi-permeable membrane, thereby creating a solvent-enriched draw solution; and maintaining the osmotic concentration gradient across the semi-permeable membrane to remove most of the solvent from the first solution.

In various embodiments of the foregoing aspect, the method includes the step of extracting the at least one solute from the first solution. The extracting step can include introducing the concentrated first solution to at least one of a solar evaporator, screen filtration, a settling vessel, a hydrocyclone, a precipitator, a force gradient operation, or nucleation point. The method can also include the step of recycling the extracted at least one solute, which can include further processing the at least one solute for at least one of a consumer or an industrial purpose. In one or more embodiments, the at least one solute can be selected from the group consisting of a salt, sugar, enzyme, protein, drug, or microorganism. The first solution can include salts, organic matter, suspended colloids, or biological organisms. In one or more embodiments, the first solution is wastewater.

In additional embodiments of the method, the step of maintaining the osmotic concentration gradient across the membrane includes the steps of directing the solvent-enriched draw solution to a separation process, removing draw solutes from the solvent-enriched draw solution, and returning the draw solutes to the second side of the semi-permeable membrane. In one or more embodiments, the step of directing the solvent-enriched draw solution to a separation process includes introducing at least a portion of the solvent-enriched draw solution to one or more of a distillation column, a membrane distillation system, or a pervaporation system. The method can also include the step of introducing waste heat to the separation process.

In another aspect, the invention relates to a forward osmosis separation process. The process includes introducing a first solution comprising a solvent and at least one precipitable solute on a first side of a semi-permeable membrane; introducing a concentrated draw solution comprising ammonia and carbon dioxide in a molar ratio of at least 1:1 to a second side of the semi-permeable membrane; concentrating the at least one precipitable solute within the first solution by promoting the flow of the solvent from the first solution, across the membrane and into the concentrated draw solution via an osmotic concentration gradient across the semi-permeable membrane, thereby creating a solvent-enriched draw solution; and recovering the at least one precipitable solute from the first solution. In certain embodiments, the process includes the step of maintaining the osmotic concentration gradient across the semi-permeable membrane to remove most of the solvent from the first solution.

In various embodiments of the foregoing aspect, the step of maintaining the concentration gradient can include the steps of directing the solvent-enriched draw solution to a separation process, removing draw solutes from the solvent-enriched draw solution, and returning the draw solutes to the second side of the semi-permeable membrane. In one or more embodiments, the step of recovering the at least one precipitable solute includes introducing the concentrated first solution to at least one of a solar evaporator, screen filtration, a settling vessel, a hydrocyclone, a precipitator, a force gradient operation, or nucleation point. Additionally, the first solution can include salts, organic matter, suspended colloids or biological organisms, and the at least one precipitable solute can be selected from the group consisting of a salt, sugar, enzyme, protein, drug, or microorganism. In one or more embodiments, the at least one precipitable solute can be an ionic salt species selected from the group consisting of chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc.

Various additional methods of desalination in accordance with the invention include exposing a first solution to a first surface of a semi-permeable membrane and a second solution that has a concentration greater than that of the first solution to a second opposed surface of the membrane. The concentration of the second solution can be increased by using a first reagent to adjust the equilibrium of solutes within the second solution to increase the amount of a soluble species of solute within second solution. The concentration gradient between the first and second solutions then draws the solvent from the first solution through the semi-permeable membrane and into the second solution producing a solvent-enriched solution. A portion of the solutes can be then precipitated and filtered out of the solvent-enriched second solution. The remaining solutes within the solvent-enriched second solution can be removed by heating the solvent-enriched second solution to decompose the remaining soluble and less soluble species of solutes into their constituent gases to recover the solvent.

In one or more embodiments, the first solution may be an aqueous solution such as seawater, brackish water, wastewater, contaminated water, or a stream from a pharmaceutical or food grade operation; however, non-aqueous solutions are also contemplated and considered within the scope of the invention. In various embodiments, the second solution may be a concentrated solution of ammonia and carbon dioxide, with resultant aqueous species: ammonium carbonate, ammonium bicarbonate, and ammonium carbamate. In some embodiments, introducing the first solution on a first side of the semi-permeable membrane can include immersing the semi-permeable membrane in the first solution. Introducing the second solution may include directing the second solution along the second side of the semi-permeable membrane. In at least one embodiment, the first solution is introduced continuously. Generally, the semi-permeable membrane will allow the passage of water (or other solvent), but exclude the dissolved solutes, such as sodium chloride, ammonium carbonate, ammonium bicarbonate, and ammonium carbamate.

In one or more embodiments, the first reagent can be a mixture of carbon dioxide and ammonia gases. The first reagent may also be the constituent gases that are recycled after being released from solution when the solute is decomposed. In a further embodiment, the second solution may be heated to about 50 to 58 degrees Celsius (C) to increase the concentration of the second solution. The concentration of the second solution may be at least 6 molal in a particular embodiment. In one embodiment, the solvent-enriched second solution may be cooled to about 18 to 25 degrees C. prior to subjecting the solvent-enriched second solution to the second reagent if the second solution was previously heated.

In further embodiments, a portion of solute may be precipitated out of the solvent-enriched second solution by adjusting the equilibrium of the solvent-enriched second solution to increase the amount of a less-soluble solute present in the solution. This may be done by adding a second reagent causing a portion of the less-soluble species to precipitate out of the solvent-enriched second solution. In one embodiment, the second reagent may be carbon dioxide gas. Additionally, the heat used to decompose the remaining soluble and less-soluble species may be waste steam from power or industrial plants, solar, geothermal, or heat pumped by heat exchange, the heat being produced by the exothermic introduction of the first and second solutes into the second solution. The constituent gases released upon heating of the solvent-enriched solution may be ammonia and carbon dioxide.

In additional embodiments, the osmotic method may include the additional steps of introducing a remaining portion of the first reagent as the second reagent to the solvent-enriched solution; recycling the precipitated less-soluble species of solvent to the second solution after filtration; and recycling the constituent gases, as the first reagent, after heating the solvent-enriched second solution. Further, the solvent may be subjected to at least one of the processes of pH balancing and supplementing with additional solutes.

In one or more embodiments, the concentrated first solution resulting from the forward osmosis process may be further processed to recover any desired solutes contained therein. In some embodiments, the concentrated first solution is pumped to solar evaporation tanks, or other processes as disclosed herein, to extract the desired solutes from the first solution. In one embodiment, the desired solute can be precipitable such that it can be filtered from the concentrated first solution. Alternatively, in the case of the first solution including undesired solutes (e.g., industrial waste), the concentrated first solution can be further processed or otherwise disposed of.

In a particular embodiment of an osmotic method in accordance with the invention, the method starts by exposing a first solution to a first surface of a semi-permeable membrane and a second solution to a second surface of the membrane. The equilibrium of the second solution may be adjusted to increase the amount of ammonium carbamate present in the solution by adding a first gas of ammonia and carbon dioxide, wherein the ammonia present in the first gas is preferentially adsorbed by the second solution. This increases the concentration of the second solution so that it is greater than that of the first solution. The second solution may then cause solvent to be drawn from the first solution through the semi-permeable membrane and into the second solution generating a solvent-enriched solution. The equilibrium of the solvent-enriched solution may then be adjusted to increase the amount of ammonium bicarbonate present in the solution by adding a second gas, which may be the carbon dioxide gas remaining from the first equilibrium adjustment. This equilibrium adjustment causes a portion of the ammonia bicarbonate to precipitate out of solvent-enriched solution and is then filtered out of solvent-enriched solution. This precipitated ammonia bicarbonate may be recycled to the second solution. The remaining solvent-enriched solution may be heated to decompose the remaining ammonia carbamate and ammonium bicarbonate into ammonia and carbon dioxide to produce potable water. The ammonia and carbon dioxide gases released from solution may then be recycled as the first gas in the present osmotic method.

In yet another aspect, the invention relates to a forward osmosis waste treatment process. The process may include introducing a first solution comprising a solvent and at least one constituent on a first side of a semi-permeable membrane and introducing a concentrated draw solution comprising ammonia and carbon dioxide in a molar ratio of at least 1:1 on a second side of the semi-permeable membrane to maintain an osmotic concentration gradient across the semi-permeable membrane. In some embodiments, the process may further include promoting flow of at least a portion of a solvent of the first solution across the semi-permeable membrane to form a second solution on the first side of the semi-permeable membrane and a dilute draw solution on the second side of the semi-permeable membrane. In some embodiments, the process may further include introducing at least a portion of the dilute draw solution to a separation operation to thereby generate draw solutes and a solvent stream. In some embodiments, the process may further include returning the draw solutes to the second side of the semi-permeable membrane. In some embodiments, the process may further include removing the at least one constituent from the second solution.

In some embodiments, introducing at least a portion of the dilute draw solution to a separation operation includes introducing at least a portion of the dilute draw solution to a distillation column, membrane distillation system, or pervaporation system. The process may further include a step of supplying waste heat to the separation operation. In at least one embodiment, the process may further include processing the solvent stream. Removing the at least one undesirable constituent may include introducing the second solution to a settling vessel, hydrocyclone or blowdown operation. The at least one undesirable constituent may be introduced to a further treatment operation.

The present invention also relates to apparatus for carrying out the various methods and processes disclosed herein for the extraction of a solvent from a first solution using forward osmosis. In one or more embodiments, the apparatus has a first chamber with an inlet and an outlet. The inlet of the first chamber may be connected to a source of the first solution. A semi-permeable membrane separates the first chamber from a second chamber. The second chamber has an inlet and first and second outlets. A third chamber may be included to receive a solvent-enriched second solution from the first outlet of the second chamber and a reagent from the second outlet of the second chamber. The third chamber may have an outlet connected to a separation process, such as a filter for filtering the solvent-enriched second solution. In one embodiment, the filter may have first and second outlets, where the first outlet is connected to the inlet of the second chamber in order to recycle a precipitated solute to the second chamber and the second outlet of the filter can be connected to an optional fourth chamber for directing the solvent-enriched second solution thereto. The fourth chamber can have a heater for heating the solvent-enriched second solution. A first outlet in the fourth chamber returns constituent gases to the inlet of the second chamber. A second outlet in the fourth chamber permits a final product, the solvent, to exit the apparatus. In alternative embodiments, the third and fourth chambers are replaced by a single separation unit.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various aspects and embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

In accordance with one or more embodiments, the disclosed osmotic separation methods and apparatus may be used to extract various types of solvents/solutes from various types of solutions. Desired products of the disclosed methods and apparatus may be the solvent, the solute, or both. In some embodiments, the invention may be used for the concentration of solutes. In at least one embodiment, products such as salts, sugars, pharmaceuticals or other compounds may be recovered from a process stream. In other embodiments, waste streams such as wastewater may be treated to recover purified water for downstream use.

In accordance with one or more embodiments, an osmotic method for extracting solvent from solution may generally involve exposing the solution to a first surface of a forward osmosis membrane. In some embodiments, the first solution (also known as a process or feed solution) may be seawater, brackish water, wastewater, contaminated water, a process stream, or other aqueous solution. In at least one embodiment, the solvent is water, but other embodiments pertain to non-aqueous solvents. A second solution (also known as a draw solution), with an increased concentration of solute relative to that of the first solution, may be exposed to a second opposed surface of the forward osmosis membrane. Solvent, for example water, may then be drawn from the first solution through the forward osmosis membrane and into the second solution generating a solvent-enriched solution via forward osmosis. Forward osmosis generally utilizes fluid transfer properties involving movement from a less concentrated solution to a more concentrated solution. Osmotic pressure generally promotes transport of solvent across a forward osmosis membrane from feed to draw solutions. The solvent-enriched solution, also referred to as a dilute draw solution, may be collected at a first outlet and undergo a further separation process. In some non-limiting embodiments, purified water may be produced as a product from the solvent-enriched solution. A second product stream, i.e., a depleted or concentrated process solution, may be collected at a second outlet for discharge or further treatment. The concentrated process solution may contain one or more target compounds that it may be desirable to concentrate or otherwise isolate for downstream use, such as industrial uses or in consumer goods.

Figure 1:
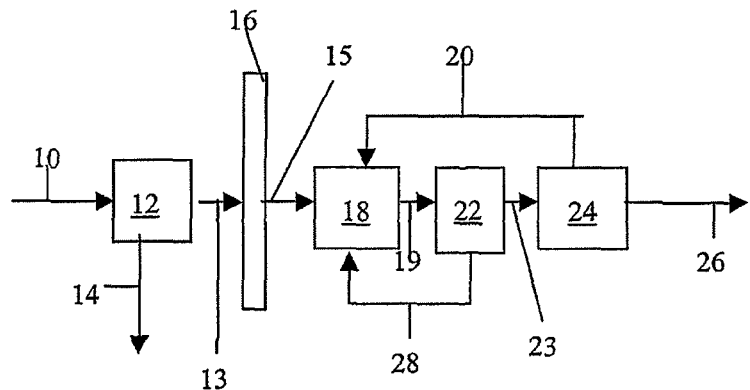
FIG. 1 is a schematic representation of a separation method in accordance with one embodiment of the invention.

FIG. 1 shows an overview diagram of a forward osmotic desalination or separation method in accordance with the invention. As shown in FIG. 1, the first solution is disposed in a first chamber 12, as illustrated by reference numeral 10. The first chamber 12 is in fluid communication with a semi-permeable membrane 16, as illustrated by arrow 13. The second solution, having a concentration greater than the first solution, is contained in second chamber 18. The higher concentration solution enables the solvent, e.g., water, from the first solution in the first chamber 12 to osmose across the semi-permeable membrane 16 into the more concentrated second solution located within the second chamber 18, as illustrated by arrow 15, a process referred to as forward osmosis. Having lost much of its solvent, the remaining first solution in the first chamber 12 is concentrated in solute, e.g., bulk salt in the case of seawater. The solute can be discarded, as illustrated by arrow 14, if considered a waste product, or if a target compound, sent for further processing or downstream for use as a desired product.

The resulting solvent-enriched second solution in the second chamber 18 is then introduced, as illustrated by arrow 19, into a third chamber 22. In the third chamber 22, solutes in the solvent-enriched second solution may be precipitated out and recycled back into the second chamber 18, as illustrated by arrow 28, to maintain the concentration of the second solution. The remaining solvent-enriched second solution in the third chamber 22 can then be introduced, as illustrated by arrow 23, into a fourth chamber 24. In the fourth chamber 24, the remaining solvent-enriched second solution may be heated to remove any remaining solutes to produce the final result, the solvent, e.g., potable water, as illustrated by arrow 26. Because in the fourth chamber 24 the heat removes any remaining solutes by breaking them down into their constituent gases, the gases may be returned to the second chamber 18, as illustrated by arrow 20, to maintain the concentration gradient of the second solution in chamber 18 and act as a reagent, as discussed in more detail below.

As noted above, a method of osmotic separation in accordance with one or more embodiments of the invention may start with the first solution contained within the first container 12. The first solution may be an aqueous or non-aqueous solution that is being treated, either for the purpose of purified water recovery, for the removal of undesirable solutes, or for the concentration and recovery of desired solutes. Included among undesirable solutes are undesired chemically precipitable soluble salts such as sodium chloride (NaCl). Typical examples of the first solution include aqueous solutions such as seawater, brine and other saline solutions, brackish water, mineralized water, industrial waste water, and product streams associated with high purity applications, such as those affiliated with the food and pharmaceutical industries. The first solution described herein may be a non-aqueous solution, such as an organic solvent. In general, any type of solvent compatible with the draw solution may be used, for example, any solvent capable of withstanding the pH, temperature and other characteristics of the draw solution. The first solution may be filtered and pre-treated in accordance with known techniques in order to remove solid and chemical wastes, biological contaminants, and otherwise prevent membrane fouling, prior to osmotic separation and is then supplied to the first chamber 12 as indicated by arrow 10.

In accordance with one or more embodiments, the first solution may be any solution containing solvent and one or more solutes for which separation, purification or other treatment is desired. In some embodiments, the first solution may be a source non-potable water such as those previously disclosed. It may be desired to produce purified or potable water from such a stream for downstream use. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc. In some examples, the first solution may be brine, such as salt water or seawater, wastewater or other contaminated water. In other embodiments, the first solution may be a process stream containing one or more solutes, such as target species, which it is desirable to concentrate, isolate, or recover. Such streams may be from an industrial process such as a pharmaceutical or food grade application. Target species may include pharmaceuticals, salts, enzymes, proteins, catalysts, microorganisms, organic compounds, inorganic compounds, chemical precursors, chemical products, colloids, food products, or contaminants. The first solution may be delivered to a forward osmosis membrane treatment system from an upstream unit operation such as industrial facility, or any other source such as the ocean.

Like the first solution, the second solution may be an aqueous solution, i.e., the solvent is water. In other embodiments, non-aqueous solutions such as organic solvents may be used for the second solution. The second solution may be a draw solution containing a higher concentration of solute relative to the first solution. A wide variety of draw solutions may be used. For example, the draw solution may comprise a thermolytic salt solution. In some embodiments, the second solution may be a concentrated solution of ammonia and carbon dioxide. In at least one embodiment, the draw solution may comprise ammonia and carbon dioxide in a molar ratio of greater than 1 to 1.

The second or draw solution has a concentration of solute greater than that of the first of feed solution. This is achieved using solutes that are soluble enough to produce a solution that has a higher concentration than the first solution. One or more characteristics of the draw solution may be adjusted based on the process stream supplied to the separation system for treatment. For example, the volume, flow rate, or concentration of solutes in the feed solution may impact one or more parameters selected for the draw solution. Preferably, the solute within the second solution should (1) be easily removable from the second solution through precipitation or decomposition; (2) form at least one species that is more readily dissolved in the solvent of the second solution, i.e., the soluble species, and one species that is not readily dissolved within the solvent, i.e., the less soluble species; and (3) pose no health risk if trace amounts of the species of solute remain in the resulting solvent. The existence of the soluble and less-soluble species of solutes allows for the solutions to be adjusted or manipulated as needed. Typically, the soluble and less-soluble solute species reach a point in solution in which, under the particular condition temperature, pressure, pH, etc., neither species of solute is either increasing or decreasing with respect to the other, i.e., the ratio of the soluble to insoluble species of solute is static. This is referred to as equilibrium. Given the particular conditions of the solution, the species of solute need not be present in a one to one ratio at equilibrium. Through the addition of a chemical, referred to as a reagent, the balance between the species of solutes can be shifted. Using a first reagent, the equilibrium of the solution can be shifted to increase the amount of the soluble species of solute. Likewise, using a second reagent, the equilibrium of the solution may be shifted to increase the amount of the less-soluble solute species. After the addition of the reagents, the ratio of species of solutes will stabilize at a new level which is favored by the conditions of the solution. By manipulating the equilibrium in favor of the soluble species of solute, the present invention is able to achieve a second solution with a concentration near saturation, a state in which the solution's solvent cannot dissolve anymore of the solute.

The preferred solutes for the second solution within the second chamber 18 are ammonia and carbon dioxide gases and their products, ammonium carbonate ($(NH_4)_2CO_3$), ammonium bicarbonate ($NH_4HCO_3$), and ammonium carbamate ($NH_2COONH_4$). Ammonia and carbon dioxide, when dissolved in water at a ratio of about 1:1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia gas so that the ratio of ammonia to carbon dioxide increases to about 1.75 to 2.0 will shift the equilibrium of the solution towards the soluble species of the solute, ammonium carbamate. The ammonia gas is more soluble in water and is preferentially adsorbed by the solution. Because ammonium carbamate is more readily adsorbed by the solvent of the second solution, its concentration can be increased, preferably, to the point where the solvent cannot adsorb anymore of the solute, i.e., saturation. In the present invention, the concentration of solutes within this second solution achieved by this manipulation is greater than about 2 molal, preferably more than about 6 molal, most preferably about 6 to 12 molal.

Ammonia gas is a preferred first reagent for ammonium carbamate since it is one of the chemical elements that results when the solute ammonium carbamate is decomposed, otherwise referred to as a constituent element. In general, it is preferred that the reagent for the solvent be a constituent element of the solute since any excess reagent can easily be removed from the solution when the solvent is removed, and, in a preferred embodiment, the constituent element can be recycled as the first reagent as discussed further below. However, other reagents that can manipulate the equilibrium of the solute species in solution are contemplated so long as the reagent is easily removed from the solution by precipitation or decomposition and the reagent poses no health risk if trace elements of the reagent remain within the final solvent.

In addition to manipulating the equilibrium of the solute species, the concentration of the second solution can be further increased by raising the temperature of the solution. For example, by raising the temperature of the second solution to about 50 to 55 degrees C., the concentration of ammonium carbamate within the solution can be increased about two-fold from about 6 to 10 molal to about 15 to 18 molal and may generate a hyper-saturated solution, a solution in which the solvent has adsorbed more solutes than it can at room temperature. However, the temperature of the solution should not exceed the temperature at which the solutes decompose, which in the case of ammonium carbamate is about 58 degrees C.

The semi-permeable membrane 16, which separates the first chamber 12 from the second chamber 18, separates solutes from the solvent as the solvent of the first solution osmoses into the second solution. Many types of semi-permeable membranes 16 are suitable for this purpose provided that they are capable of allowing the passage of the solvent (e.g., water) while blocking the passage of the solutes (e.g., sodium chloride, ammonium carbonate, ammonium bicarbonate, ammonium carbamate, other salts, sugars, drugs or other compounds) and not reacting with the solutes in the solution. The membrane 16 can have a variety of configurations including thin-films, hollow fiber membranes with thin walls or fabric like configurations consisting of hollow fibers and monofilaments, asymmetric and composite membranes in spiral wound and disk tube configurations, and so forth. There are numerous commercially available semi-permeable membranes that are characterized by having pores small enough to allow water to pass while screening out solute molecules such as sodium chloride (NaCl) and their ionic molecular species such as chloride. Such semi-permeable membranes can be made of organic membranes made of materials such as cellulose acetate, cellulose nitrate, polysulfone, polyvinylidene fluoride, polyamide and acrylonitrile co-polymers; mineral membrane or ceramic membranes made of materials such as $ZrO_2$ and $TiO_2$; and so forth.

Preferably, the material selected for use as the semi-permeable membrane should generally be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0 degrees C. to about 100 degrees C. In some non-limiting embodiments, process temperatures may range from about 40 degrees C. to about 50 degrees C. Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and about 11. In certain non-limiting embodiments, the pH level may be about 7 to about 10 (for example, the second solution may be slightly alkaline with a pH of about 8 to 9.6). The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive. Given the efficiency of the present method, the overall surface area of the membrane 16 used can be greatly reduced in comparison to the prior art methods of desalination.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

The present process begins by bringing the first solution and the second solution into contact with the first and second sides of the semi-permeable membrane 16, respectively. With respect to a corresponding apparatus, a forward osmosis separation system in accordance with the invention is generally constructed and arranged so as to bring the first solution and the second solution into contact with first and second sides of the semi-permeable membrane, respectively. Although the first and second solutions can remain stagnant, it is preferred that both the first and second solutions are introduced by cross flow, i.e., flows parallel to the surface of the semi-permeable membrane 16. This may generally increase membrane surface area contact along one or more fluid flow paths, thereby increasing the efficiency of the forward osmosis process. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

Since the second solution in the second chamber 18 has a higher solute concentration than the first solution in the first chamber 12, the solvent in the first solution diffuses to the second solution by forward osmosis. The difference in concentration between the two solutions is so great that the solvent passes through the semi-permeable membrane 16 without the addition of pressure to the first solution. For example, seawater typically has a salt concentration of about 0.6 molal, which is significantly less than the solute concentration of about 6-10 molal within the second solution. The concentration gradient between the first solution (saltwater) and the second solution (saturated with ammonium carbamate) generates an osmotic pressure of about 150 atm on the first solution. The typical pressure exerted on saltwater in reverse osmosis is about 50 to 70 atm. This permits the flow rate of water from the saltwater across the semi-permeable membrane 16, otherwise known as flux, in the present invention to be at least about 2 to 3 times the flux achieved using reverse osmosis. The flux can be further increased by applying external pressure to the first solution.

During the desalination process, the first solution becomes more concentrated as it loses solvent and the second solution becomes more diluted as it gains solvent. Despite this occurrence, the concentration gradient between the two solutions remains significant. For example, when the solutions are stagnant the first solution becomes saturated when it experiences an approximately 90% decrease in volume. At this point, the solutes contained within the first solution begin to precipitate. Yet, throughout the final 10% reduction of the first solution, the rate of flow remains significant. Despite the ability of the present process to maintain a significant rate of flow throughout the process, it is preferred when the solutions are stagnant or circulated that additional solutes are introduced to the second solution to maintain the second solution's concentration at about the concentration it had before it came into contact with the first solution. Preferably the additional solutes are recycled within the process as discussed further below. This maintains the increased flux of water across the semi-permeable membrane 16.

Overall, this process results in the removal of about 95 to 99% of the solvent contained within the first solution due largely to the increased concentration of the second solution resulting from the equilibrium shift induced by the addition of the first reagent. Overall, this process results in an average rate of flow across the membrane 16 that appears to be significantly higher than the average rate of flow of the reverse osmosis process. Further efficiencies are achieved in comparison to reverse osmosis since forward osmosis across the membrane 16 does not compact the membrane as commonly occurs with the mechanical pressure used in reverse osmosis. Additionally, with the flow rates of the present invention, the overall surface area of the semi-permeable membrane 16 can be reduced without affecting the overall efficacy of the process, also resulting in substantial savings.

The depleted solution on the first side of the membrane, and the diluted solution on the second side of the membrane may each be further processed for the recovery of one or more desired products. For example, the depleted solution on the first side of the membrane may contain solutes which are target species whose concentration and recovery is desired. Alternatively, the depleted solution on the first side of the membrane may be discarded as waste. Likewise, the diluted solution on the second side of the membrane may be rich in solvent which may be a desired product.

Referring back to FIG. 1, the discharge 14 (i.e., the concentrated first solution) has a greater concentration of solutes, which can be removed from the concentrated first solution prior to returning the first solution to its source or recirculating the first solution through the present method. This can be done, for example in some non-limiting embodiments, by contacting the concentrated first solution with a solar evaporator, a mechanism of simple screen filtration, a hydrocyclone, a force gradient operation, or a precipitation mass or other nucleation point, to precipitate the solute. This precipitated solute may be further processed to make it suitable for consumer or industrial purposes.

Having extracted the solvent of the first solution into the second solution by forward osmosis, thereby forming a solvent-enriched second solution, it may then be desirable to remove the solutes from the solvent-enriched second solution to isolate the solvent. In some non-limiting embodiments, this can be accomplished by precipitating the solutes out of the solution, decomposing the solutes into their constituent gases that vaporize out of solution, distilling the solvent out of the solution or absorption of the solutes onto a surface. In at least one embodiment, removing a portion of the solutes by precipitation decreases the amount of energy required to heat the solution to decompose the remaining solutes, and decomposition results in the complete removal of the solutes. Potential precipitation and decomposition steps are described with reference to the third and fourth chambers 22, 24, respectively.

The solvent-enriched second solution in the second chamber 18 may be withdrawn to a third chamber 22, as shown by arrow 19. The solvent-enriched second solution may then be treated to remove a portion of the solutes from the solvent-enriched solution by precipitation. A second reagent may be introduced to adjust the equilibrium of the soluble and less-soluble solute species in favor of the less-soluble solute species. As with the first reagent, any chemical capable of adjusting the equilibrium is suitable so long as it is easily removed from the solvent-enriched second solution and poses no health risk. Preferably the reagent is a constituent element of the solute, and in the case of the preferred solute ammonium carbamate is carbon dioxide gas. In some non-limiting embodiments, when the solvent-enriched second solution is diffused with carbon dioxide, the ratio of ammonia to carbon dioxide in solution may be reduced to around between 0.5 and 1.5 and the equilibrium in the solvent-enriched second solution shifts back towards the less-soluble species of solute, ammonium bicarbonate. The less-soluble species of solute may then precipitate out of solution. The precipitation of the ammonium bicarbonate may result in a substantial reduction in the concentration of solutes within the solvent-enriched second solution to about 2 to 3 molal. Preferably, the temperature of the solvent-enriched second solution in the third chamber 22 is lowered to about 18 to 25 degrees C., preferably about 20 to 25 degrees C., to assist in the precipitation of the solute. The precipitated solute may then be filtered from the solution.

Figure 2:
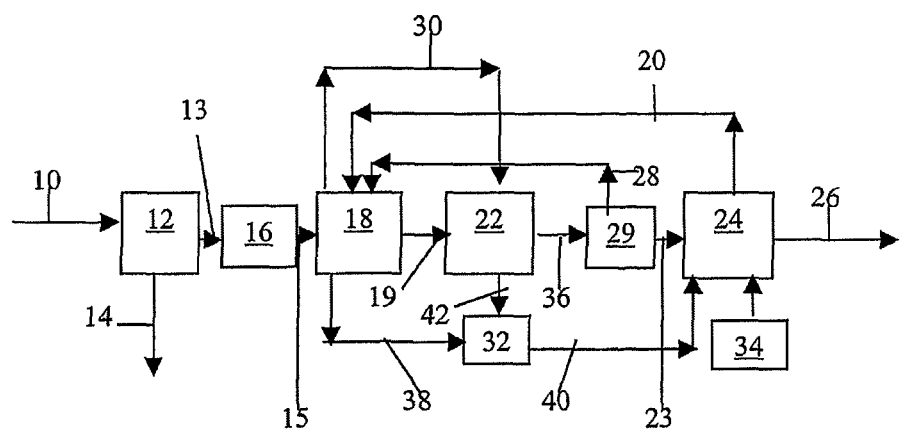
FIG. 2 is a schematic representation of a separation method in accordance with another embodiment of the invention.

Referring now to FIG. 2, although the precipitated solute may be filtered within the third chamber 22, the solution may be directed to a filtration chamber 29, as shown by arrow 36. Using well known methods, such as a hydrocyclone, a sedimentation tank, column filtration, or a simple screen filtration, the precipitated solute may be removed from the solvent-enriched solution. For example, the precipitate may be allowed to settle out of solution by gravity and then siphoned off. The remaining solvent-enriched second solution may be transferred from the filter chamber 29 to a fourth chamber 24, as shown by arrow 23, where it is then heated to decompose the solutes into their constituent gases. In one particular embodiment, these constituent gases may be ammonia and carbon dioxide. The energy required for the separation process is the heat required to raise the temperature of the solution to a temperature which results in the complete removal of the solute, for example, ammonium carbamate. In one example, the energy required for the separation process is that heat required to raise the temperature of the solution from approximately 15 to 18 degrees C. (sea water temperature) to approximately 30 to 60 degrees C., more preferably about 60 degrees C. (for the complete removal of the ammonium carbamate solute), but no higher than 100 degrees C.

Additional heat may also be required to make up for the inefficiency of heat transfer of the enthalpies of vaporization and solution of the solutes recycled within the process. Specifically, heating causes the remaining solutes in the solvent-enriched second solution to decompose into their constituent gases, which leave the solution. In some embodiments, a vacuum or air flow may be maintained over the solvent-enriched second solution while it is being heated in order to improve the efficiency with which the decomposition gases vaporize out of solution. By generating the air flow over the fourth chamber it may be possible to remove all the solutes at a lower temperature than typically used. This decomposition may result in a solvent product, such as a potable water product, which may be further treated for end use, for example, by the addition of solutes such as chlorine or fluorine. In general, a potable water product should have a pH of about 7, and further pH adjustments may be necessary to make the water suitable for its intended purpose.

The solvent-enriched second solution may be heated using a combination of external heat sources 34 and heat pumped through a heat exchanger 32 from the exothermic introduction of gases and solutes 38, 42. The external heat source 34 may be supplied by any thermal source including solar and geothermal energy. The sources may be similar to those of distillation. In some embodiments, the sources may be primarily from cogeneration environments, making use of waste heat from power generation or industrial processes. Furthermore, the process efficiency may be maintained by using a heat exchanger 32 to capture the heat released during the previous steps in the present method of desalination. As shown by the arrows 38 and 42 in FIG. 2, heat released from the chemical reactions within the second and third chambers 18, 22 may be pumped to the heat pump 32 that then pumps this heat to the fourth chamber 24 to assist in heating the solvent-enriched second solution, as shown by arrow 40. In an alternative embodiment, additional heat is generated by allowing the constituent gases released to condense on the exterior of the chamber 24 in which the solvent-enriched second solution is being heated, thus, transferring the energy from this exothermic reaction to the fourth chamber 24. The condensate, which in one preferred embodiment is ammonium carbamate, may then be recycled to the second solution in the second chamber 18.

It is also preferable to recycle the solutes and solute constituents removed from the second solution to limit the environmental impact and cost of the present method of forward osmosis separation. The precipitated solute discarded from a filtration chamber may be recycled to the second chamber 18 where it can dissolve in the second solution and thereby maintain the high concentration of the second solution, as shown by arrow 28. Additionally, the constituent gases removed from the solvent-enriched second solution in the fourth chamber 24 can be recycled back to the second or third chambers 18, 22 as shown by arrows 20 and 30, respectively, where they act as reagents. In one preferred embodiment, the solute is ammonium carbamate, which is decomposed into its constituent gases: ammonia and carbon dioxide. These gases are then recycled to the second chamber 18 as shown by arrow 20. Since the ammonia is more soluble than the carbon dioxide, the ammonia is preferentially adsorbed by the second solution and acts as a reagent by adjusting the equilibrium of the solute species in favor of ammonia carbamate. The remaining carbon dioxide is withdrawn from the second chamber 18, as shown in arrow 30, and transferred to the third chamber 22 where it acts as a reagent and alters the equilibrium of the second solution in favor of ammonium bicarbonate. Since some embodiments contemplate recycling the constituent gases derived from the decomposition of the solutes, it may be necessary to precipitate less than optimal amounts of the solutes to ensure that enough gas is recycled to maintain the efficiency of the present process. Typically, removing about half of the solutes from solution by precipitation should assure that sufficient amounts of the constituent gases will be generated to maintain the present process.

The processes described herein may be conducted continuously, or in batches, to better isolate the solutions throughout the process.

Figure 3:
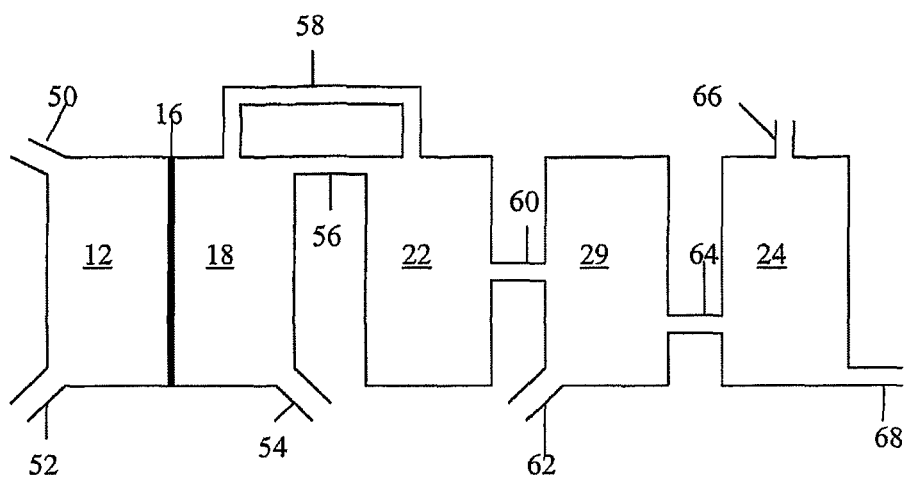
FIG. 3 is a schematic representation of an apparatus used in a separation method in accordance with one embodiment of the invention.

One non-limiting embodiment of an apparatus for conducting the present method is detailed in FIG. 3. The apparatus has a first chamber 12 that has an inlet 50 and outlet 52. The inlet 50 for the first chamber 12 is in communication with a source for the first solution, such as a holding tank for solution having undergone pre-treatment or being introduced from an upstream operation, or to a natural source for the first solution, such as the sea, a lake, stream, or other bodies of water and waterways. The inlet 50 for the first chamber 12 may incorporate a pump in order to siphon the first solution from its source. It also may optionally include heating or cooling devices in order to adjust the temperature of the first solution. Similarly, the outlet 52 for the first chamber 12 may incorporate a pump in order to extract the first solution from the first chamber 12. The outlet 52 may be used to recirculate the first solution directly to the source for the first solution, although preferably, the first solution will be pumped into or across a precipitation device prior to being returned to the source of the first solution. Such a precipitation device may include a solar evaporation bed, a mechanism of simple screen filtration, a hydrocyclone, or a precipitation mass or other nucleation point operation or other types known to those skilled in the art. The first chamber 12 is separated from a second chamber 18 by a semi-permeable membrane 16.

The second chamber 18 has an inlet 54 and first and second outlets 56, 58. The inlet 54 provides a source for the second solution and may incorporate a pump as well as a heating device. The first outlet 56 for the second chamber 18 is in communication with a third chamber 22, and provides a conduit for transferring the solvent-enriched second solution to the third chamber 22. This first outlet 56 for the second chamber 18 can incorporate a pump to withdraw the water-enriched second solution from the second chamber 18. In another embodiment, the first outlet 56 for the second chamber 18 may incorporate a cooling device to cool the solvent-enriched second solution as discussed above. The second outlet 58 for the second chamber 18 provides a conduit for any gas formed when the solvent from the first solution is drawn through the semi-permeable membrane 16 into the second solution, which in a particular embodiment would be carbon dioxide gas, to be transferred to the third chamber 22.

In some embodiments, the third chamber 22 is where a portion of the solute is precipitated out of the solvent-enriched second solution. The third chamber 22, in addition to inlets for communication with the outlets 56, 58 of the second chamber 18, has an outlet 60 in communication with a filtration device 29 for separating the precipitate from the solvent-enriched second solution. The filtration device 29 is of any of the types disclosed above, for example a sedimentation tank. The filtration device 29 has two outlets: the first outlet 62 may be used to dispose of the precipitated solute or return it to the second chamber 18 through the second chamber inlet 54, and the second outlet 64 may be used to transfer the remaining solvent-enriched second solution to a fourth chamber 24. In an alternative embodiment, the filtration device 29 may be incorporated into the third chamber 22 in which case the third chamber 22 will have an additional outlet, one outlet to transfer the remaining solvent-enriched second solution to the fourth chamber 24 and another outlet to dispose of the precipitated solute or, in a particular embodiment, return the precipitated solute to the second chamber 18 through the second chamber inlet 54.

The fourth chamber 24 may incorporate a heating device for heating the remaining solvent-enriched second solution. The fourth chamber 24 includes a first outlet 66, which may incorporate a vacuum, fan, or other device for generating airflow, for venting the constituent gases. In one or more embodiments, the first outlet 66 of the fourth chamber 24 is in communication with the inlet 54 for the second chamber 18 to recycle the constituent gases as the second solute. A second outlet 68 acts as a conduit for withdrawing the final solvent product, such as potable or purified water.

Figure 4:
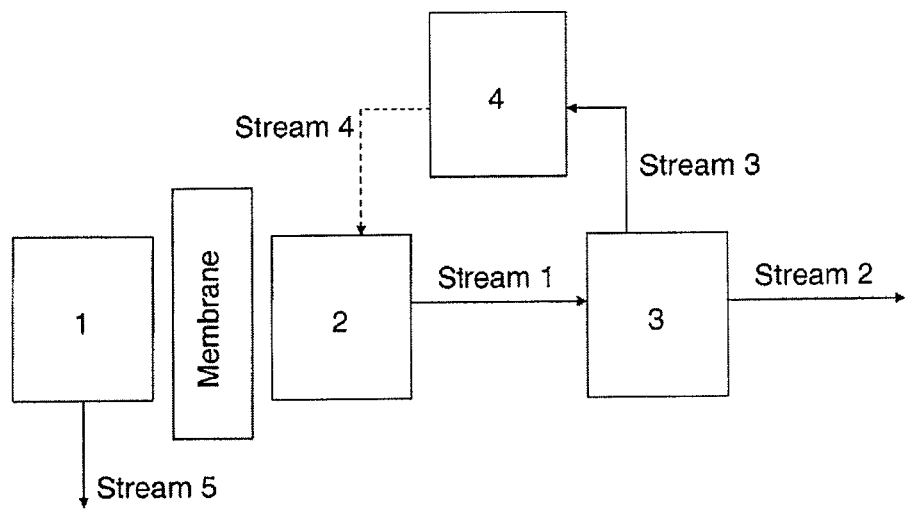
FIG. 4 is a schematic representation of an apparatus used in a separation method in accordance with another embodiment of the invention.

FIG. 4 depicts another apparatus and corresponding method for osmotic separation in accordance with one or more embodiments of the invention. As shown, a first solution 1 is exposed to one side of a forward osmosis membrane. In embodiments where the first solution comprises a waste stream to be treated, the first solution is typically aqueous and contains a solution of species such as salts, proteins, catalysts, microorganisms, organic or inorganic chemicals, chemical precursors or products, colloids, or other constituents. In embodiments where the first solution contains desired target species to be concentrated and recovered, the first solution may comprise a pharmaceutical, salt, enzyme, protein, catalyst, microorganism, organic compound, inorganic compound, chemical precursor, chemical product, colloid, food product or contaminant. The exposure of the first solution to one side of the membrane may be achieved in many configurations, two of which are immersion of the membrane in the solution or direction of the solution past the membrane. This solution may be introduced continuously, in batch, once or many times, to a vessel or direction means.

A second solution 2, comprising, for example, species including water, ammonia, and carbon dioxide capable of generating an osmotic pressure which is higher than that of the first solution, is exposed to the side of the membrane opposite that exposed to the first solution. This exposure may be achieved by many techniques, but may include immersion of the membrane in the second solution (though not if immersion is used for the first solution) or the direction of the second solution past the membrane surface. The membrane, being impermeable to all or some of the species of the first solution, such as salts, charged and/or large molecules, microorganisms, and particulate matter, but allowing the passage of the solvent, such as water, allows the difference in osmotic pressure between the first and second solutions to induce a flux of water through the membrane from the first to the second solution. This flux may be allowed to significantly, partly, or largely dilute the second solution and/or concentrate the first solution. Some, none, few, or one of the select or target species of the first solution may also be expected to pass through the membrane, depending on the membrane type and/or the intention of the process use.

A portion of the solvent-enriched second solution is directed (via stream 1) to a draw solute separation operation 3, such as a distillation column, membrane distillation operation, or pervaporation operation, which causes the solutes in the solvent-enriched second solution, for example ammonia and carbon dioxide solutes, including species of ammonium salts, to be removed by adding heat to the draw solute separation operation 3 and/or applying a pressure difference to the gases above and/or produced by the draw solute separation operation. This produces a solvent stream, designated stream 2, which is reduced in concentration of the species of stream 1, either partially, substantially, or completely, and a gas stream, designated stream 3, containing the removed species from stream 1. Stream 3 is directed to an operation designated to reconstitute the second solution which will be used to augment, replace, or maintain the characteristics of the second solution, such as volume or concentration. This operation may include dissolving the species in water, a portion of the second solution, precipitation and mixing with the second solution or some other method, such that the species removed in the separation operation 3 are reintroduced to the second solution. This reintroduction is shown as the dashed stream 4. Rejected components of solution 1 may be removed from solution 1, periodically or continuously, as water is removed from this solution. This operation may include settling, hydrocyclone separation, precipitation, force gradient (such as electrical or magnetic), blowdown, or other unit operation. This stream of components removed from 1 is shown as stream 5. In some embodiments, stream 5 may be a desired product stream or may be discarded as waste. By these techniques, osmotic pressure is used to remove solvent from a solution by osmotically driven flux through a semi-permeable membrane, for example separating solvent from a pharmaceutical compound, food product, or other desired species in solution, or treating a process stream by the removal of undesired solutes to produce a purified product stream.

Any materials may be used to construct the various holding and/or storage devices (chambers, vessels, and receptacles), conduits, piping, and related equipment, as long as they will withstand the weight of the solutions and be unreactive with any solutes within the solutions. Typical materials are non-corrosive, non-reactive materials, such as stainless steel, plastic, polyvinyl chloride (PVC), fiberglass, and so forth. The vessels can take any suitable configuration, but are typically cylindrical tanks, contoured or fitted tanks, and so forth. The receptacles are typically water towers, cylindrical tanks, contoured or fitted tanks, and so forth. As discussed above, it is important to note that the chambers are shown as separate units but the invention is not limited to that configuration, and where appropriate, any number of chambers can be contained within a single vessel and separated by one or more membranes.

The size and configuration of the holding devices are not critical to the invention. It is contemplated that the present invention would be implemented on a scale suitable for a particular application, for example, generating potable water suitable for use within various size communities or concentrating solutes for particular industrial or consumer uses.

The heating and cooling devices can be electrical heaters, refrigeration units, solar collectors, and heat exchangers, such as steam condensers, circulators and so forth as are well known in the art, but preferably heat exchangers. The heating and cooling devices, along with any other equipment used within the process of the present invention, that may have power requirements, can derive their energy from any variety of commonly used sources, including by for example, waste steam, solar energy, wind or geothermal energy, and conventional sources.

Accordingly, it is to be understood that the embodiments of the invention herein described are merely illustrative of the application of the principles of the invention. Reference herein to details of the illustrated embodiments is not intended to limit the scope of the claims, which themselves recite those features. It should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

What is claimed is:

1. A method of concentrating at least one solute using a forward osmosis separation process, the method comprising the steps of:
   introducing a first solution comprising the at least one solute to a first side of a semi-permeable membrane;
   introducing a concentrated draw solution comprising ammonia and carbon dioxide in a molar ratio of at least 1:1, as draw solute, to a second side of the semi-permeable membrane;
   concentrating the at least one solute within the first solution by promoting the flow of a solvent from the first solution, across the membrane and into the concentrated draw solution via an osmotic concentration gradient across the semi-permeable membrane, thereby creating a solvent enriched draw solution; and
   maintaining the osmotic concentration gradient across the semi-permeable membrane to remove most of the solvent from the concentrated first solution, wherein the step of maintaining the osmotic concentration gradient across the membrane comprises the steps of:
   directing the solvent enriched draw solution to a separation process;
   removing the at least one draw solute from the solvent enriched draw solution; and
   returning the removed draw solute to the second side of the semi-permeable membrane.

2. The method of claim 1, further comprising the step of extracting the at least one solute from the concentrated first solution.

3. The method of claim 2, wherein the step of extracting the at least one solute comprises introducing the concentrated first solution to at least one of a solar evaporator, screen filtration, a settling vessel, a hydrocyclone, a precipitator, a force gradient operation, or nucleation point.

4. The method of claim 2, further comprising processing the extracted at least one solute for at least one of a consumer or an industrial purpose.

5. The method of claim 1, wherein the at least one solute is selected from the group consisting of a salt, sugar, enzyme, protein, drug, or microorganism.

6. The method of claim 1, wherein the first solution comprises salts, organic matter, suspended colloids or biological organisms.

7. The method of claim 1, wherein the first solution comprises wastewater.

8. The method of claim 1, wherein the step of directing the solvent enriched draw solution to a separation process comprises introducing at least a portion of the solvent enriched draw solution to at least one of a distillation column, a membrane distillation system, or a pervaporation system.

9. The method of claim 1, further comprising a step of introducing waste heat to remove at least one solute from the solvent enriched draw solution.

10. A forward osmosis separation process, comprising:
introducing a first solution comprising a solvent and at last one precipitable solute on a first side of a semi-permeable membrane;
introducing a concentrated draw solution comprising ammonia and carbon dioxide in a molar ratio of at least 1:1, as draw solute, to a second side of the semi-permeable membrane;
concentrating the at least one precipitable solute within the first solution by promoting the flow of the solvent from the first solution, across the membrane and into the concentrated draw solution via an osmotic concentration gradient across the semi-permeable membrane, thereby creating a solvent enriched draw solution;
maintaining the osmotic concentration gradient across the semi-permeable membrane to remove most of the solvent from the first solution;
wherein the step of maintaining the osmotic concentration gradient across the semi-permeable membrane comprises the steps of: directing the solvent enriched draw solution to a separation process; removing draw solutes from the solvent enriched draw solution; returning the draw solutes to the second side of the semi-permeable membrane; and
recovering the at least one precipitable solute from the concentrated first solution.

11. The process of claim 10, wherein the step of recovering the at least one precipitable solute comprises introducing the concentrated first solution to at least one of a solar evaporator, screen filtration, a settling vessel, a hydrocyclone, a precipitator, a force gradient operation, or nucleation point.

12. The process of claim 10, wherein the at least one precipitable solute is selected from the group consisting of a salt, sugar, enzyme, protein, drug, or microorganism.

13. The process of claim 10, wherein the first solution comprises salts, organic matter, suspended colloids, or biological organisms.

14. The process of claim 10, wherein the at least one precipitable solute comprises an ionic salt species selected from the group consisting of chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc.

* * * * *